United States Patent
Li et al.

(10) Patent No.: US 12,412,583 B2
(45) Date of Patent: Sep. 9, 2025

(54) METHOD, APPARATUS AND ELECTRONIC DEVICE FOR DISPLAYING

(71) Applicant: Beijing Zitiao Network Technology Co., Ltd., Beijing (CN)

(72) Inventors: Xiang Li, Beijing (CN); Wenhai Yang, Beijing (CN); Yeting Jiang, Beijing (CN)

(73) Assignee: Beijing Zitao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/921,715

(22) Filed: Oct. 21, 2024

(65) Prior Publication Data

US 2025/0046313 A1 Feb. 6, 2025

Related U.S. Application Data

(63) Continuation of application No. PCT/CN2023/087649, filed on Apr. 11, 2023.

(30) Foreign Application Priority Data

Apr. 29, 2022 (CN) .......................... 202210495727.6

(51) Int. Cl.
*G10L 15/26* (2006.01)
*G10L 15/06* (2013.01)
(Continued)

(52) U.S. Cl.
CPC ............ *G10L 15/26* (2013.01); *G10L 15/063* (2013.01); *H04N 7/15* (2013.01); *H04N 21/4884* (2013.01); *G10L 2015/0633* (2013.01)

(58) Field of Classification Search
None
See application file for complete search history.

(56) References Cited

U.S. PATENT DOCUMENTS 9,576,498 B1 * 2/2017 Zimmerman ............ G09B 7/02
10,573,312 B1 * 2/2020 Thomson ................ G10L 15/22
(Continued)

FOREIGN PATENT DOCUMENTS

| CN | 105163170 A | 12/2015 |
| CN | 108650543 A | 10/2018 |

(Continued)

OTHER PUBLICATIONS

Office action received from Japanese patent application No. 2024-563048 mailed on Jun. 3, 2025, 8 pages (4 pages English Translation and 4 pages Original Copy).

(Continued)

*Primary Examiner* — Neeraj Sharma

(57) ABSTRACT

Embodiments of the present disclosure disclose a method, apparatus and electronic device for displaying. A particular implementation of the method comprises: obtaining subtitle information of a multimedia conference, wherein the subtitle information is obtained by converting voice information in the multimedia conference; determining content to be annotated in the subtitle information; obtaining annotation information of the content to be annotated; and displaying the subtitle information and displaying the annotation information corresponding to the content to be annotated. In this way, a new displaying approach for a multimedia conference is provided.

18 Claims, 6 Drawing Sheets

(51) Int. Cl.
*H04N 7/15* (2006.01)
*H04N 21/488* (2011.01)

(56) References Cited

U.S. PATENT DOCUMENTS

| | | | | |
|---|---|---|---|---|
| 10,607,609 | B2* | 3/2020 | Sommers | G06F 40/58 |
| 2011/0087491 | A1* | 4/2011 | Wittenstein | G10L 15/26 |
| | | | | 704/235 |
| 2011/0184736 | A1* | 7/2011 | Slotznick | G10L 15/1815 |
| | | | | 704/E15.001 |
| 2011/0301943 | A1* | 12/2011 | Patch | G06F 3/167 |
| | | | | 704/9 |
| 2014/0222417 | A1* | 8/2014 | Lu | G10L 15/183 |
| | | | | 704/9 |
| 2017/0154264 | A1 | 6/2017 | Chen et al. | |
| 2017/0262419 | A1 | 9/2017 | Dunne et al. | |
| 2018/0039634 | A1 | 2/2018 | Goldstein et al. | |
| 2019/0272141 | A1* | 9/2019 | Poel | H04M 7/0027 |
| 2019/0341050 | A1* | 11/2019 | Diamant | G06V 40/172 |
| 2020/0258525 | A1* | 8/2020 | McQuiston | G06Q 10/109 |
| 2022/0254353 | A1* | 8/2022 | Kroehl | G01N 35/00584 |
| 2022/0310077 | A1* | 9/2022 | Tu | G10L 15/22 |

FOREIGN PATENT DOCUMENTS

| | | |
|---|---|---|
| CN | 108804555 A | 11/2018 |
| CN | 108962220 A | 12/2018 |
| CN | 10925567 A | 1/2019 |
| CN | 111161737 A | 5/2020 |
| CN | 112084756 A | 12/2020 |
| CN | 113010698 A | 6/2021 |
| CN | 113837830 A | 12/2021 |
| JP | 2004364182 A | 12/2004 |
| JP | 2007-163568 A | 6/2007 |

OTHER PUBLICATIONS

Office action received from CN patent application No. 202210495727.6 mailed on Jul. 7, 2025, English Translation, 19 pages.

* cited by examiner

METHOD, APPARATUS AND ELECTRONIC DEVICE FOR DISPLAYING

CROSS REFERENCE

This application claims priority to Chinese Patent Application No. 202210495727.6, filed on Apr. 29, 2022 and entitled "METHOD, APPARATUS AND ELECTRONIC DEVICE FOR DISPLAYING", which is hereby incorporated herein by reference in its entirety.

FIELD

The present disclosure relates to the field of computer technologies, and in particular, to a method, apparatus and electronic device for displaying.

BACKGROUND

With the development of the Internet, users increasingly use functions of a terminal device, so that work and life are more convenient. For example, a user may start a multimedia conference with other users online by a terminal device. Through online multimedia conferences, users may interact over long distances, and users may start conferences without gathering in one place. Multimedia conferences largely avoid the location and venue restrictions of traditional face-to-face meetings.

SUMMARY

This disclosure is provided to introduce the concepts in a simplified form, which are described in detail in the detailed description section in the following. This disclosure is not intended to identify key features or essential features of the claimed technical solution, nor is it intended to be used to limit the scope of the claimed technical solution.

In a first aspect, embodiments of the present disclosure provide a method of displaying. The method includes: obtaining subtitle information of a multimedia conference; wherein the subtitle information is obtained by converting voice information in the multimedia conference, determining content to be annotated in the subtitle information; obtaining annotation information of the content to be annotated; and displaying the subtitle information and displaying the annotation information corresponding to the content to be annotated.

In a second aspect, embodiments of the present disclosure provide an apparatus for displaying, including: a first obtaining unit configured to obtain subtitle information of a multimedia conference, wherein the subtitle information is obtained by converting voice information in the multimedia conference; a determining unit configured to determine content to be annotated in the subtitle information; a second obtaining unit configured to obtain annotation information of the content to be annotated; and a displaying unit configured to display the subtitle information and display the annotation information corresponding to the content to be annotated.

In a third aspect, embodiments of the present disclosure provide an electronic device, including: one or more processors; and a storage device, configured for storing one or more programs, the one or more programs, when executed by the one or more processors, causing the one or more processors to implement the method of displaying of the first aspect.

In a fourth aspect, embodiments of the present disclosure provide a computer readable medium, having a computer program stored thereon, the computer program, when executed by a processor, implementing steps of the method of displaying of the first aspect.

Embodiments of the present disclosure provide a method, apparatus and electronic device for displaying. Subtitle information of a multimedia conference is obtained and the subtitle information may be obtained by converting voice information in the multimedia conference. Content to be annotated may be determined in the subtitle information. Then, annotation information of the content to be annotated may be obtained. Then, the subtitle information may be displayed and the annotation information corresponding to the content to be annotated may be displayed. In this way, a new displayed approach may be obtained. By means of the display approach, annotation information may be displayed to a participant object of a multimedia conference, and by means of these annotation information, the speed of the participant object understanding a multimedia conference may be improved, thereby avoiding interruption of a conference process or occurrence of incorrect understanding because the meaning of other participating users is not understood. Therefore, the interaction accuracy and interaction efficiency of the multimedia conference may be improved.

BRIEF DESCRIPTION OF THE DRAWINGS

The above and other features, advantages, and aspects of various embodiments of the present disclosure will become more apparent with reference to the following detailed description taken in conjunction with the accompanying drawings. Throughout the drawings, the same or similar reference numbers refer to the same or similar elements. It is to be understood that the drawings are schematic, and components and elements are not necessarily drawn to scale.

DETAILED DESCRIPTION

Figure 1:
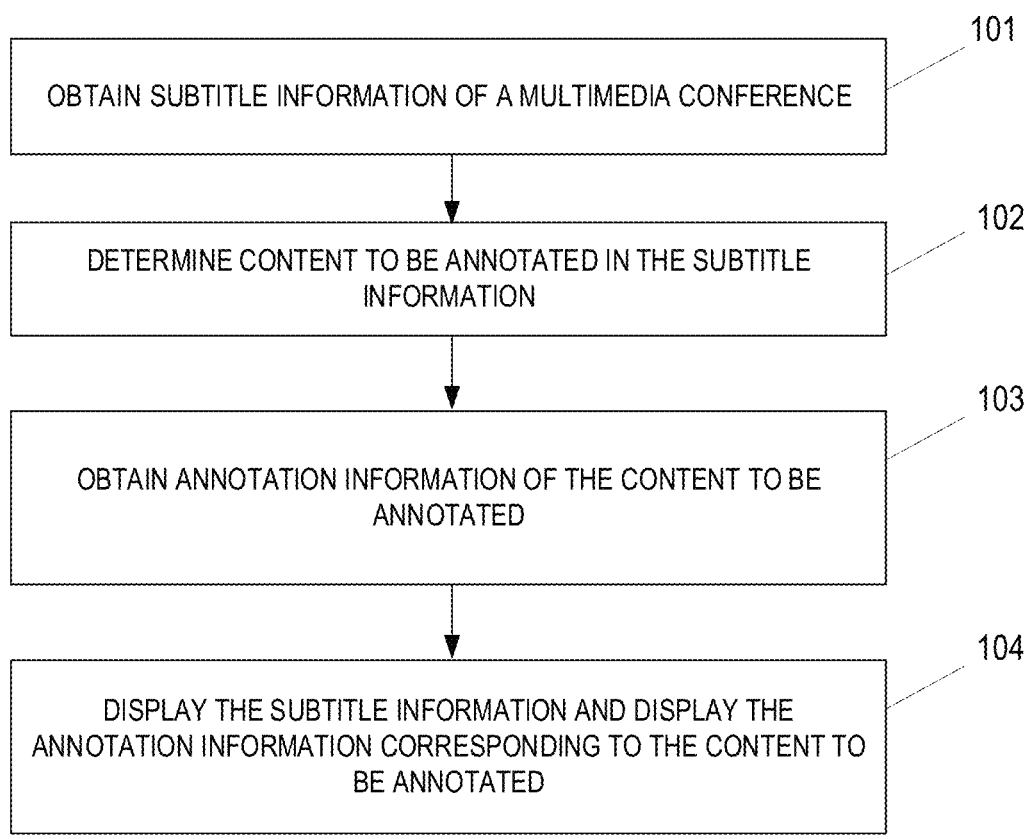
FIG. 1 is a flow diagram of an embodiment of a method of displaying according to the present disclosure.

Embodiments of the present disclosure will be described in more detail below with reference to the accompanying drawings. Although certain embodiments of the present disclosure are shown in the drawings, it should be understood that the present disclosure may be implemented in various forms and should not be construed as being limited to the embodiments set forth herein, but rather these embodiments are provided for a thorough and complete understanding of the present disclosure. It should be understood that the drawings and embodiments of the present disclosure are merely examples and are not intended to limit the scope of the present disclosure.

It should be understood that the steps recited in the method implementations of the present disclosure may be executed in different orders, and/or executed in parallel. Furthermore, method implementations may include additional steps and/or omit the performance of illustrated steps. The scope of the present disclosure is not limited in this respect.

The term "comprise" and variations thereof, as used herein, is inclusive, that is, "including but not limited to". The term "based on" is "based at least in part on". The term "an embodiment" means "at least one embodiment"; the term "another embodiment" means "at least one further embodiment"; The term "some embodiments" means "at least some embodiments". Relevant definitions of other terms will be given in the following description.

It should be noted that, the "first", "second", and other concepts mentioned in the present disclosure are only used to distinguish different apparatuses, modules, or units, but are not used to limit the sequence or dependency of functions performed by these apparatuses, modules, or units.

It should be noted that the modifications of "a" and "a plurality of" mentioned in the present disclosure are illustrative rather than restrictive, and those skilled in the art should understand that they should be understood as 'one or more' unless the context clearly indicates otherwise.

The names of messages or information interacted between a plurality of apparatuses in the embodiments of the present disclosure are only for illustrative purposes, and are not intended to limit the scope of these messages or information.

Reference is made to FIG. 1, which shows a flowchart of an embodiment of a method of displaying according to the present disclosure. As shown in FIG. 1, the method of displaying includes the following steps:

Step 101, subtitle information of a multimedia conference is obtained.

Here, the subtitle information is obtained by converting voice information in the multimedia conference.

In this embodiment, the multimedia conference may be an online conference in a multimedia manner. The multimedia may include at least one of audio and video. A multimedia conference interface may be a related interface of the multimedia conference.

In this embodiment, the application for starting the multimedia conference may be any type of application, which is not limited herein, For example, the application may be an instant video conference application, a communication application, a video playing application and a mail application, etc.

In this embodiment, the voice information of the participant object in the multimedia conference may be converted into the subtitle information. For example, a participating user in a multimedia conference may include A, B, and C. When the participating user in the conference speaks, the speech of the participating user may be converted into subtitle information.

In this embodiment, the subtitle information may be displayed in real time or delayed relative to the speech time. Alternatively, the subtitle information may be displayed on a multimedia stream display interface, that is, a real-time multimedia stream of a participant object. Alternatively, the interface for displaying the subtitle information may also be presented side by side with the multimedia stream display interface.

In some embodiments, the multimedia conference is a real-time multimedia conference that is in progress of the conference. In the conference process of the real-time multimedia conference, the subtitle information and annotation information are displayed.

In some embodiments, the multimedia conference is a multimedia conference that has ended. Alternatively, the subtitle information may also be displayed after the multimedia conference ends.

Step 102, content to be annotated in the subtitle information is determined.

Here, the content to be annotated is determined from the subtitle information according to a predefined determination basis.

In this embodiment, the content to be annotated may be content to which annotations are to be added. Alternatively, the content to be annotated may be a word, that is, the content to be annotated may also be referred to as a word to be annotated.

Here, the content to be annotated may be words that are difficult for participating users to understand. The content to be annotated may be determined according to a predetermined condition. The predetermined condition may be set according to an actual condition and are not limited here.

Step 103, annotation information of the content to be annotated is obtained.

In this embodiment, annotation information of the content to be annotated may be obtained. The annotation information may be information to interpret the content to be annotated.

Alternatively, the annotation information may be obtained from a predetermined database. Alternatively. the annotation information may be obtained from the Internet.

Step 104, the subtitle information is displayed and the annotation information corresponding to the content to be annotated is displayed.

In this embodiment, the subtitle information may be displayed, and the displayed subtitle information may include the content to be annotated. In other words, while the subtitle information is displayed, the content to be annotated may also be displayed. The annotation information of the content to be annotated may also be displayed.

Alternatively, annotation information may be displayed corresponding to the displayed content to be annotated. For example, the annotation information is adjacent to the display position of the content to be annotated.

It should be noted that, in the method of displaying provided by this embodiment. Subtitle information of a multimedia conference is obtained and the subtitle information may be obtained by converting voice information in the multimedia conference. Content to be annotated may be determined in the subtitle information. Then, annotation information of the content to be annotated may be obtained. Then, the subtitle information may be displayed and the annotation information corresponding to the content to be annotated may be displayed. In this way, a new displayed approach may be obtained. By means of the display approach, annotation information may be displayed to a participant object of a multimedia conference, and by means of these annotation information, the speed of the participant object understanding a multimedia conference may be improved, thereby avoiding interruption of a conference process or occurrence of incorrect understanding because the meaning of other participating users is not understood. Therefore, the interaction accuracy and interaction efficiency of the multimedia conference may be improved.

In some embodiments, the step 102 may include: determining a user group lexicon corresponding to a user group, based on a participating user of the multimedia conference belonging to the user group, wherein the user group lexicon comprises entries and entry explanations; and determining the content to be annotated in the subtitle information based on the user group lexicon.

Here, the user group lexicon includes entries and explanations of the entries. The setting approach of the entries in the user group lexicon is not limited herein.

Alternatively, the user group lexicon corresponding to the user group may be determined based on all participating users of the multimedia conference belonging to the user group. For example, participating users A, B and C belong to a same user group, and the content to be annotated may be determined by using a user group lexicon of the user group.

Alternatively, the user group lexicon corresponding to the user group may be determined based on part of participating users of the multimedia conference belonging to the user group. For example, participating users A and B belong to a first user group, and participating user C belongs to a second user group; alternatively, the content to be annotated may be determined by using a user group lexicon corresponding to the first user group; alternatively, the content to be annotated may be determined by using a user group lexicon corresponding to the first user group and a user group lexicon corresponding to the second user group; alternatively, the content to be annotated may be determined by using a user group lexicon corresponding to the second user group.

Alternatively, for the content to be annotated determined by using the user group lexicon corresponding to the first user group, annotation information of the content to be annotated may be displayed to a participant object belonging to the first user group, or displayed to a participant object belonging to the second user group, For the content to be annotated determined by using the user group lexicon corresponding to the first user group and the user group lexicon corresponding to the second user group, annotation information of the content to be annotated may be displayed to a participant object belonging to the first user group, and displayed to a participant object belonging to the second user group. For the content to be annotated determined by using the user group lexicon corresponding to the second user group, annotation information of the content to be annotated may be displayed to a participant object belonging to the second user group, or displayed to a participant object belonging to the second user group.

It should be noted that by determining a user group lexicon based on a participating user belonging to the user group and determining content to be annotated based on the user group lexicon, entries that may have specific meanings within an enterprise may be displayed to the participating users, so as to help the user accurately understand the meanings expressed by other participating users, thereby improving the interaction efficiency of a multimedia conference.

Figure 2:
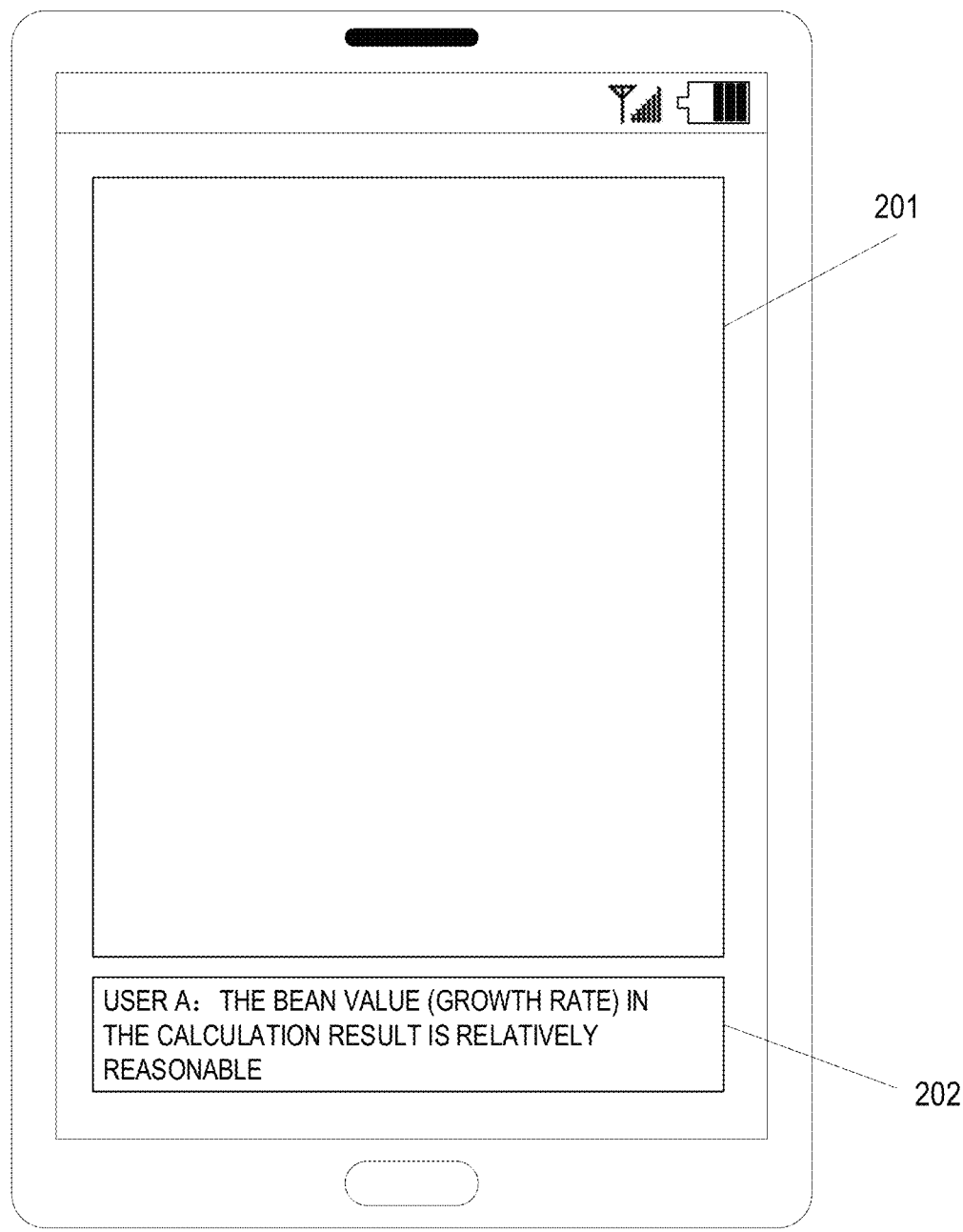
FIGS. 2, 3 and 4 are schematic diagrams of application scenarios of a method of displaying according to the present disclosure.

As an example, reference may be made to FIG. 2, which shows a scenario in which annotation information is displayed for an enterprise entry in subtitle information. In FIG. 2, a multimedia stream of a multimedia conference (such as real-time video of a participating user, shared content, etc.) may be displayed in a multimedia stream display region 201. The subtitle "the bean value in the calculation result is reasonable" corresponding to the voice of a user A may be displayed in the subtitle display area 202, in which the "bean value" may be an entry in the user group lexicon corresponding to the user group, and the "bean value" may display the annotation information "growth rate" correspondingly.

Alternatively, the determining the content to be annotated in the subtitle information based on the user group lexicon may comprise: selecting, from words of the subtitle information, a word contained in an entry having a predefined feature in the user group lexicon, as the content to be annotated.

In some embodiments, the determining the content to be annotated in the subtitle information based on the user group lexicon may comprise: selecting, from words of the subtitle information, a word that hits an entry having a predefined feature in the user group word stock as the content to be annotated.

Here, the entry in the user group lexicon may have some attributes, and these attributes may include, but are not limited to, at least one of: length of the entry, language of the entry; whether the entry is an abbreviated entry; the number of times that the entry appears in a set of predetermined documents, frequency of the entry appears in the set of predetermined documents, and whether the entry appears in a set of predetermined dictionary.

Here, a predefined feature may indicate feature defined in advance that are used to indicate a word that may be difficult for the participant object to understand.

As an example, the predefined features may include, but are not limited to, at least one of: length of the entry is greater than a predetermined length threshold, language of the entry is a predetermined language, the entry is an abbreviated entry, the number of occurrences of the entry in the set of predetermined documents is not greater than a predetermined number threshold, the occurrence frequency of the entry in the set of predetermined documents is not greater than a predetermined frequency threshold, and the entry does not appear in the set of predetermined dictionary.

It should be noted that, entries with predefined features among the entries in the user group lexicon are used as the basis for determining the content to be annotated, which can effectively narrow the range of the content to be annotated and avoid the occurrence of a case in which a large number of words are annotated in the subtitle information and the emphasis is blurred.

In some embodiments, the predefined features include that the entry is an abbreviated entry and the annotation information includes a full name of the entry. Step 104 includes: displaying a full name of an entry corresponding to the content to be annotated.

Here, the entry being an abbreviated entry which may indicate that the entry is an abbreviation for an entry with the same meaning. Generally, in communication, people may use words in a relatively simple form to indicate words in a relatively complex form, so as to improve communication efficiency. However, the meaning of simpler words (e. g., abbreviations) may be confusing to those who do not have a grasp of them.

As an example, an abbreviation of an Internet Data Center may be IDC. If an "IDC" appears in the subtitle information, and an entry with a predefined feature in the user group lexicon includes "IDC" (the entry is an abbreviated entry), the "IDC" in the subtitle information may be determined as an entry to be annotated. The full name of the entry to be annotated may include Internet Data Center and/or Internet Data Center.

Figure 3:
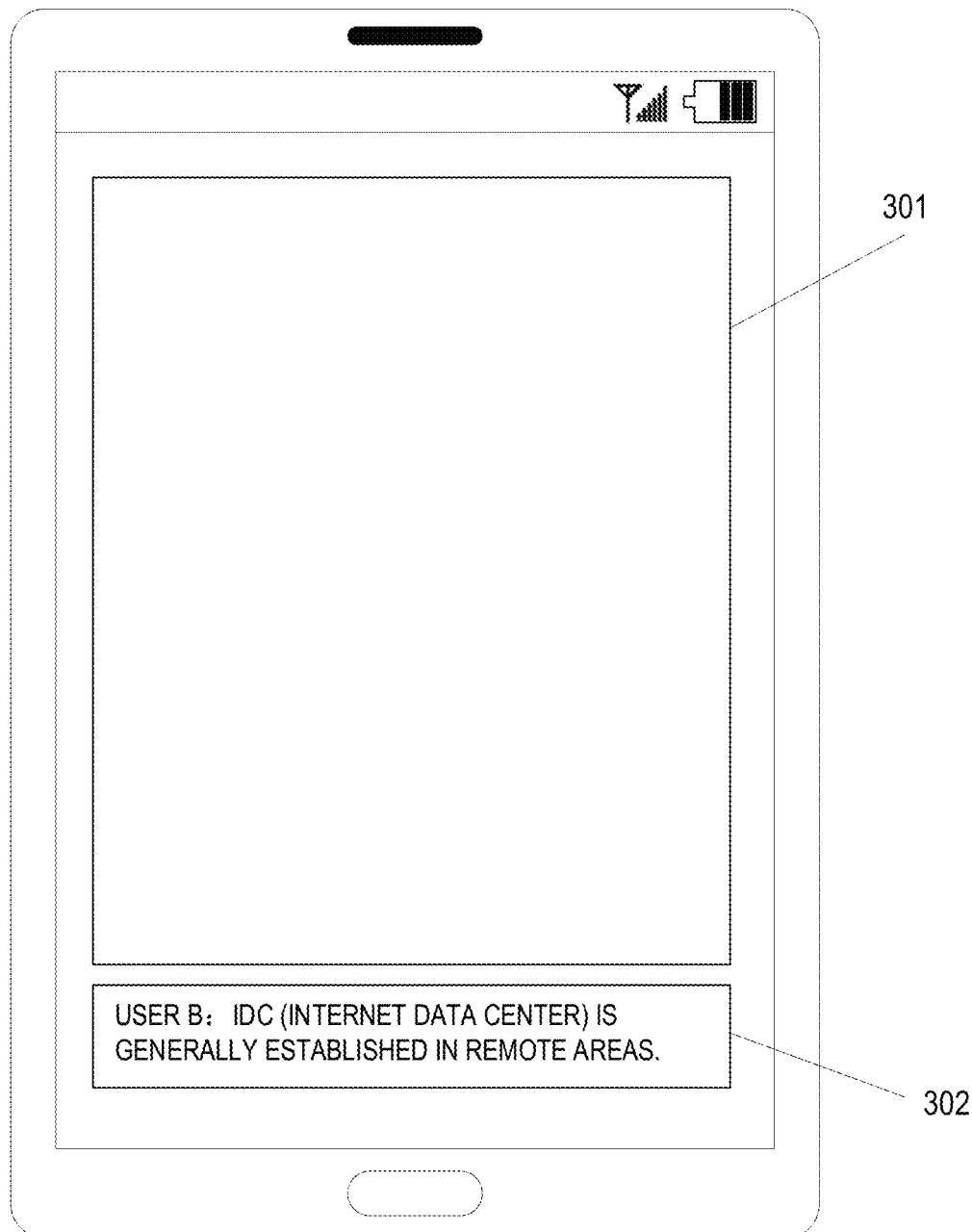

As an example, reference may be made to FIG. 3, which shows a scenario in which annotation information is displayed correspondingly to an abbreviated entry in an enterprise entry in the subtitle information. In FIG. 3, a multimedia stream of a multimedia conference (such as, real-time video of a participating user, shared content, etc.) may be displayed in the multimedia stream display region 301. The subtitle display area 302 may display the subtitle corresponding to user B's voice "IDC is generally established in remote areas.", where "IDC" may be an abbreviated entry in the user group lexicon corresponding to the user group, then the annotation information "Internet Data Center" may be displayed correspondingly to the "IDC".

It should be noted that, by using an abbreviated entry that is hit in the user group lexicon as a basis for determining the content to be annotated, the interaction efficiency can be improved. Specifically, for a participating user who uses an abbreviated entry, when the user wishes to use the abbreviated entry for expression, he/she does not need to worry about other participating users not being able to understand so that he/she needs to change the way of expression (changing the way of expression requires additional time to think). For a participating user who receives the abbreviated entry but does not know the meaning, the meaning of the abbreviated entry may be quickly obtained by referring to the annotation information, so as to avoid misunderstanding of meaning due to lack of understanding, thereby improving the interaction efficiency of the multimedia conference.

In some embodiments, step 102 may comprise: determining a first language of the multimedia conference; determining the content to be annotated from words in a second language in the subtitle information.

Here, the first language may be a fundamental language of the multimedia conference, and the fundamental language may be a major language used in the multimedia conference.

In some embodiments, the first language may be determined based on at least one of, but not limited to, a region of a participant object of the multimedia conference, a native language of the participant object of the multimedia conference and a preset language of the multimedia conference.

In some embodiments, the first language may be set by the participant object.

In some embodiments, the first language may be determined by identifying the voice of the participant object.

In some embodiments, the first language may be determined according to a participant object, for example, may be determined according to the region of a participant object of the multimedia conference, or may be determined according to the language used by the participant object in an application.

Here, the second language is a different language from the first language. Alternatively, the second language is a language other than the first language. Alternatively, the second language is a specified language different from the first language.

As an example, the first language of the multimedia conference may be determined to be Chinese, and a language other than Chinese may be determined to be the second language. For example, the second language may include English. If Chinese and English appear in a multimedia conference, the content to be annotated may be selected from English words.

It should be noted that, in a multimedia conference, if another language other than the first language occurs, it may cause difficulties for participant objects to understand the multimedia conference. Words in the second language is set as content to be annotated, which may improve the understanding of participant objects of the meanings expressed by words in the second language and improve the interaction efficiency of multimedia conferences.

In some embodiments, the determining the content to be annotated from words in a second language in the subtitle information comprises: selecting, from the words in the second language in the subtitle information, a word contained in a predetermined lexicon in the second language, as content to be annotated.

Here, the lexicon in the second language includes entries in the second language and corresponding paraphrases in the first language.

Here, the approach of presetting the lexicon in the second language may be set according to actual situations and is not limited herein.

In some embodiments, the lexicon in the second language may include entries with a usage frequency less than a predetermined usage frequency threshold.

It should be noted that some commonly used words in the second language may not be difficult for participating users to understand. Some words are selected from the words in the second language and these words are preset as the lexicon in the second language, and the words which hit the lexicon are determined as contents to be annotated. The number of times of determining words in the second language in the subtitle information as the content to be annotated may be reduced, so as to more accurately select words that are difficult to understand for participating users, avoid extensive annotation of words in the second language in subtitle information, and reduce interference to participating users.

In some embodiments, the paraphrases in the first language include at least two sub-paraphrases; and the step 104 may include: selecting a sub-paraphrase related to context information from the paraphrases in the first language corresponding to the content to be annotated, based on the content to be annotated being located in the context information in the subtitle information; and displaying the selected sub-paraphrase corresponding to the content to be annotated.

As an example, the second language includes English, the content to be annotated (English words) selected from the subtitle information may have a Chinese paraphrase, and the Chinese paraphrase may include at least two sub-paraphrases. In this case, a sub-paraphrase related to the context information may be selected from Chinese paraphrases of the content to be annotated based on the content to be annotated (English word) being located in the context information in the subtitle information.

In some embodiments, the context may include words in the first language and/or words in the second language. By comparing meaning expressed by the first language term and/or the second language term, sub-paraphrases related to the context are selected.

It should be noted that by identifying and processing the context information, the selected sub-paraphrases may fit the context, thereby improving the accuracy of the displayed sub-paraphrases. Therefore, the accuracy of participant objects' understanding of words in the second language may be improved, thereby improving the accuracy of participant objects' understanding of the multimedia conference and improving the accuracy and efficiency of information interaction in multimedia conferences.

In some embodiments, the step 102 may include: selecting, from words in the subtitle information, a word contained in a predetermined lexicon of rarely-used words, as the content to be annotated.

In some embodiment, the language to which a rarely-used word belongs in the lexicon of rarely-used words may include words in any language, for example, may include words in the first language and words in a non-first language.

It should be noted that the lexicon of rarely-used words is set, the content to be annotated is selected by using the lexicon of rarely-used words, and annotation information of rarely-used words selected from the subtitle information is displayed. Therefore, for a participant object, if other participant objects in a multimedia conference express with a rarely used word, the participant object may also accurately understand with the annotation information of the rarely used word, which improves the understanding of the multimedia conference by the participants of the multimedia conference, thereby improving the interactive efficiency of multimedia conferences.

In some embodiments, the foregoing step 104 may include: displaying the content to be annotated in the subtitle information, in association with the corresponding annotation information.

Here, the specific implementation of the associated display may be set according to an actual application scenario, which is not limited herein.

As an example, the annotation information may be displayed above or below the content to be annotated to achieve the associated display.

As an example, the annotation information may be displayed in a bubble, and the bubble points to the content to be annotated to achieve associated display.

It should be noted that through associated display, annotation information may be explicitly prompted for the content to be annotated, thereby improving accuracy of the provided annotation information.

In some embodiments, the content to be annotated in the subtitle information is displayed in association with the corresponding annotation information by at least one of: at least one difference in display styles existing between the content to be annotated and content in the displayed subtitle other than the content to be annotated; an area for displaying annotation information and an area for displaying subtitle being non-overlapping; the area for displaying the annotation information being embedded in the area for displaying the subtitle; in response to triggering on the content to be annotated, displaying the annotation information corresponding to the content to be annotated; displaying the annotation information in a floating window, in association with the corresponding content to be annotated; or a first displaying duration of the content to be annotated in the subtitle information being not greater than a second displaying duration of the corresponding annotation information in a real-time multimedia conference.

Here, there is at least one difference in the display styles between the content to be annotated and other content in the displayed subtitles other than the content to be annotated. As an example, the content to be annotated (bean value) in FIG. 2 may be displayed in a different display style from other content (in a calculation result, relatively reasonable), for example, the content to be annotated may be displayed in bold or italicized mode and the like (the difference is not shown in the figure).

Here, the area for displaying annotation information and the area for displaying subtitle are non-overlapping. In other words, the annotation information and the subtitle information may be displayed in separate areas.

Here, the area for displaying annotation information is embedded in the area for displaying subtitle. In other words, the annotation information is displayed in the area for displaying subtitle, for example, as shown in FIG. 2.

Here, in response to triggering on the content to be annotated, annotation information corresponding to the content to be annotated may also be displayed. In other words, annotation information is displayed in response to a triggering by a user. In this way, the interference of the annotation information on the viewing of subtitle information by the participant object may be reduced.

Alternatively, the foregoing step 102 may include at least one of but is not limited to: determining the content to be annotated according to a user operation; or the electronic device automatically determining the content to be annotated.

Here, the annotation information is displayed in a floating window, in association with the corresponding content to be annotated. In this way, the annotation information may be displayed in association with the content to be annotated without affecting the display of the subtitle information.

Here, in a real-time multimedia conference, the first displaying duration of the content to be annotated in the subtitle information is not greater than the second displaying duration of the corresponding annotation information. In other words, the duration of the annotation information stays on the interface is greater than or equal to the duration the content to be annotated in the subtitle information terminal stays. Therefore, the annotation information may be fully displayed to help users understand the content to be annotated.

In some embodiments, the method further includes: for content to be annotated appearing at least twice in the multimedia conference, determining an interval between the content to be annotated appearing not for the first time and the content to be annotated being previously displayed with corresponding annotation information; and in response to the interval satisfying a predetermined interval condition, displaying the content to be annotated appearing not for the first time, with the corresponding annotation information.

Here, for the content to be annotated appearing for the first time, annotation information may be correspondingly displayed.

As an example, the same content to be annotated may appear multiple times in a multimedia conference process. For a same word that appears multiple times, the frequency of appearance of the word may be controlled. For example, for the same word, the time interval between two displays of the annotation information is greater than one minute. For example, for the same word, the interval between two displays of the annotation information is greater than five lines.

Figure 4:
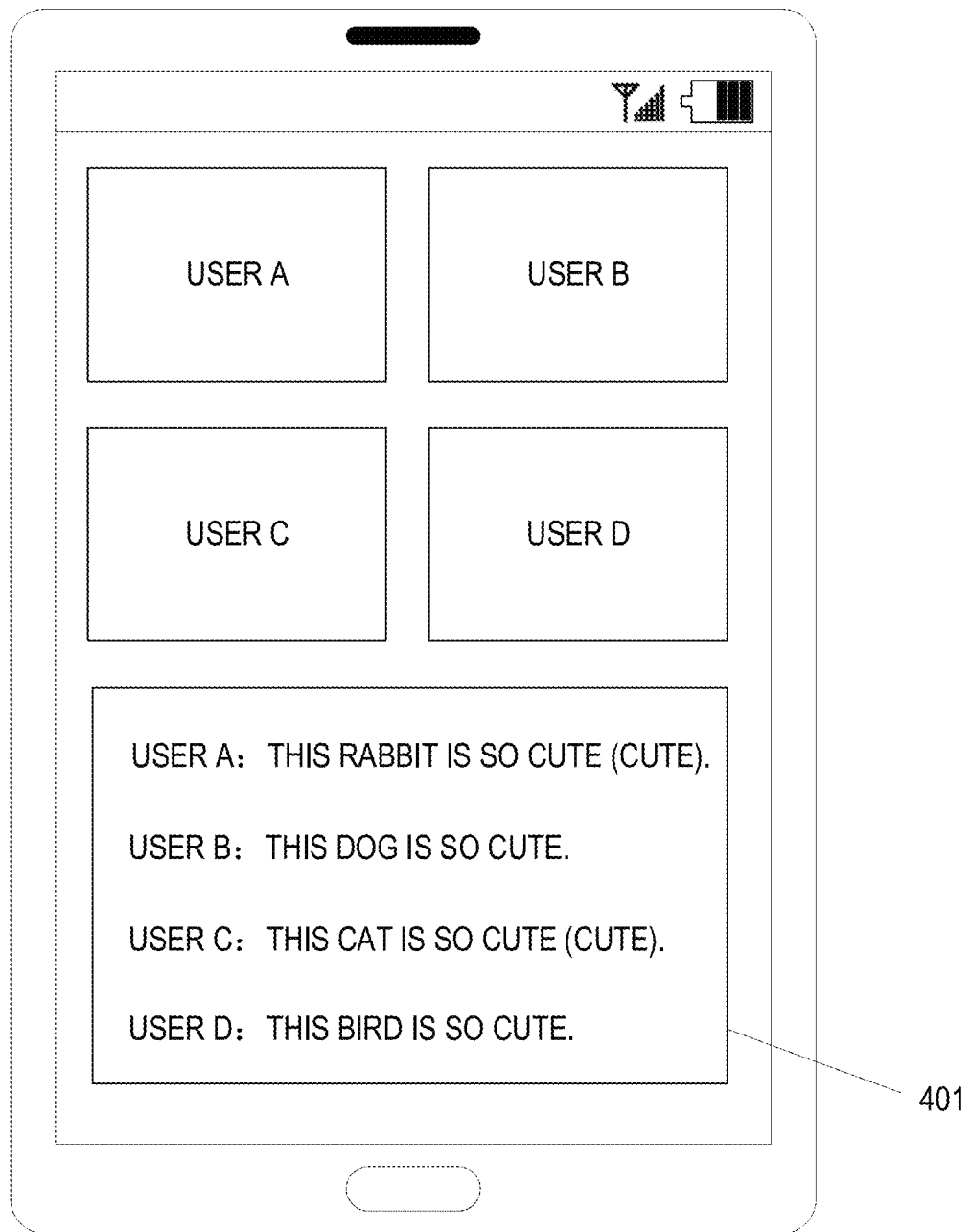

As an example, reference is made to FIG. 4, which illustrates an example scenario of controlling the annotation frequency of the content to be annotated. In FIG. 4, the area for displaying annotation information 201 may display the subtitle information corresponding to the voice of the participating user. In the subtitle information corresponding to the voices of the user A, the user B, the user C, and the user D, the English word "cute" corresponding to the Chinese word "cute" appears, that is, the "cute" appears many times in the multimedia conference process. The cute mentioned by the user A is the first occurrence, and the cute mentioned by the user B, the user C, and the user D is the content to be annotated that appears not for the first time.

In FIG. 4, when the subtitle information of the voice information of the user B includes the content to be annotated ("cute"), it may be determined that the interval between the cute mentioned by the user B and the preceding "cute" corresponding to the annotation information is 0 line. If the interval condition is not less than one line, it may be determined that the cute mentioned by the user B does not satisfy the interval condition, and the annotation information (i.e., "cute") is not displayed corresponding to the "cute" mentioned by the user B.

In FIG. 4, when the subtitle information of the voice information of the user C includes the content to be annotated ("cute"), it may be determined that the interval between the cute mentioned by the user C and the preceding "cute" corresponding to the annotation information is 1 line. If the interval condition is not less than one line. it may be determined that the cute mentioned by the user C satisfies the interval condition, and the annotation information (i.e., "cute") is displayed corresponding to the "cute" mentioned by the user C.

It should be noted that for the same content to be annotated, by controlling the frequency of displaying annotation information, the interference to users caused by frequent display of annotation information may be reduced in a case where users temporarily understand the content to be annotated and users may be helped to understand the content to be annotated in a case where participating users have not seen the annotation information of the content to be annotated for a long time. Therefore, the reduction of interference to users may be balanced and the degree of timely reminders to users may be improved, and the interaction efficiency of the multimedia conference may be improved.

In some embodiments, the interval comprises a time interval indicating an interval between voice information corresponding to the content to be annotated.

In some embodiments, the method further includes: in response to a time interval between a time when the content to be annotated appears not for the first time and a time when the content to be annotated was previously displayed with the corresponding annotation information being greater than a predetermined duration threshold, determining that the time interval satisfies the predetermined interval condition.

As an example, the same content to be annotated may appear multiple times in a multimedia conference process. For the same word that appears multiple times, the frequency of appearance of the word may be controlled. For example, for the same word, the interval between two displays of the annotation information is greater than one minute.

It should be noted that by displaying the time interval of the annotation information of the same content to be annotated, effective prompts may be provided according to the forgetting rules of human beings. As an example, if a short memory duration of a human is 5 minutes, the display interval of the same annotation information may be controlled to be not less than 5 minutes. In this way, the participating user may further remember 5-minute content of the annotation information of the content to be annotated and the annotation information is not displayed. After the participating user may have forgotten the annotation information for five minutes, the annotation information is displayed again.

In some embodiments, the interval comprises a text interval, and the text interval is used to represent a position interval of the same content to be annotated in the subtitle information.

In some embodiments, the method further includes: in response to a text interval between a time when the content to be annotated appears not for the first time and a time when the content to be annotated was previously displayed with the corresponding annotation information being greater than a predetermined duration threshold, determining the text interval satisfies the predetermined interval condition.

As an example, the same content to be annotated may appear multiple times in a multimedia conference process. For the same word that appears multiple times, the frequency of appearance of the word may be controlled. For example, for the same word, the location interval between two displays of the annotation information is greater than five lines.

Alternatively, the text interval may indicate the space between texts. The text interval may include, but is not limited to, at least one of the following: the size between display locations of texts on the interface, or the interval between sentences to which the texts belong. The size between display locations of texts on the interface may be expressed by using an absolute size and may also be expressed by using a line difference between text lines where the text is located in the subtitle information.

In some embodiments, the text length threshold indicates a line difference between text lines in the subtitle information being greater than a predetermined line difference.

It should be noted that by displaying the text interval of the comment information of the same content to be annotated, effective prompts may be provided that fit the display approach for subtitle information and the viewing approach of the user. As an example, if the area for displaying the subtitle in FIG. 2 may display 5 lines of subtitle information at a time, a display interval of the same annotation information may be controlled to be not less than five lines. Therefore, the participating user may see 5 lines content of the annotation information of the content to be annotated and the annotation information is not displayed. When the participating user may have forgotten the annotation information and there is no prompt on the current page (that is, after an interval of 5 lines), the annotation information may be displayed again.

Figure 5:
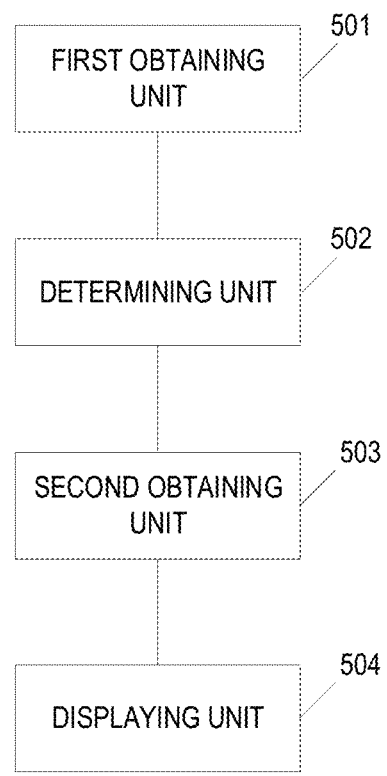
FIG. 5 is a schematic structural diagram of an embodiment of an apparatus for displaying according to the present disclosure.

Reference is further made to FIG. 5, as an implementation of the method shown in the foregoing drawings, the present disclosure provides an embodiment of an apparatus for displaying. The apparatus embodiment corresponds to the method embodiment shown in FIG. 1, and the apparatus may be specifically applied to various electronic devices.

As shown in FIG. 5, the apparatus for displaying of this embodiment includes: a first obtaining unit 501, a determining unit 502, a second obtaining unit 503 and a displaying unit 504. The first obtaining unit is configured to obtain subtitle information of a multimedia conference, wherein the subtitle information is obtained by converting voice information in the multimedia conference; the determining unit is configured to determine content to be annotated in the subtitle information; the second obtaining unit is configured to obtain annotation information of the content to be annotated; and the displaying unit is configured to display the subtitle information and display the annotation information corresponding to the content to be annotated.

In this embodiment, specific processing of the first obtaining unit 501, the determining unit 502, the second obtaining unit 503, and the displaying unit 504 of the apparatus for displaying, and the technical effects thereof may be referred to relevant descriptions of the corresponding step 101, step 102, step 103 and step 104 in FIG. 1, which will not be repeated here.

In some embodiments, the determining content to be annotated in the subtitle information comprises: determining a user group lexicon corresponding to a user group, based on a participating user of the multimedia conference belonging to the user group, wherein the user group lexicon comprises entries and entry explanations; and determining the content to be annotated in the subtitle information based on the user group lexicon.

In some embodiments, the determining the content to be annotated in the subtitle information based on the user group lexicon comprises: selecting, from words of the subtitle information, a word contained in an entry having a predefined feature in the user group lexicon, as the content to be annotated.

In some embodiments, the predefined feature comprises an entry being an abbreviated entry, and the annotation information comprises a full name of the entry; and the displaying the subtitle information and displaying the annotation information corresponding to the content to be annotated comprise: displaying a full name of an entry corresponding to the content to be annotated.

In some embodiments, the determining content to be annotated in the subtitle information comprises: determining a first language of the multimedia conference, wherein the first language is determined based on at least one of: a region of a participant object of the multimedia conference, a native language of the participant object of the multimedia conference and a preset language of the multimedia conference; and determining the content to be annotated from words in a second language in the subtitle information, wherein the second language is a language other than the first language.

In some embodiments, the determining the content to be annotated from words in a second language in the subtitle information comprises: selecting, from the words in the second language in the subtitle information, a word contained in a predetermined lexicon in the second language, as content to be annotated, wherein the lexicon in the second language comprises entries in the second language and corresponding paraphrases in the first language.

In some embodiments, the paraphrases in the first language comprise at least two sub-paraphrases; and the displaying the subtitle information and displaying the annotation information corresponding to the content to be annotated comprise: selecting a sub-paraphrase related to context information from the paraphrases in the first language corresponding to the content to be annotated, based on the content to be annotated being located in the context information in the subtitle information; and displaying the selected sub-paraphrase corresponding to the content to be annotated.

In some embodiments, the determining content to be annotated in the subtitle information comprises: selecting, from words in the subtitle information, a word contained in a predetermined lexicon of rarely-used words, as the content to be annotated.

In some embodiments, the displaying the subtitle information and the displaying the annotation information corresponding to the content to be annotated comprises: displaying the content to be annotated in the subtitle information, in association with the corresponding annotation information.

In some embodiments, the content to be annotated in the subtitle information is displayed in association with the corresponding annotation information by at least one of: at least one difference in display styles existing between the content to be annotated and content in the displayed subtitle other than the content to be annotated; an area for displaying annotation information and an area for displaying subtitle being non-overlapping; the area for displaying the annotation information being embedded in the area for displaying the subtitle; in response to triggering on the content to be annotated, displaying the annotation information corresponding to the content to be annotated; displaying the annotation information in a floating window, in association with the corresponding content to be annotated; or a first displaying duration of the content to be annotated in the subtitle information being not greater than a second displaying duration of the corresponding annotation information in a real-time multimedia conference.

In some embodiments, the apparatus is further configured to: for content to be annotated appearing at least twice in the multimedia conference, determine an interval between the content to be annotated appearing not for the first time and the content to be annotated being previously displayed with corresponding annotation information; and in response to the interval satisfying a predetermined interval condition, display the content to be annotated appearing not for the first time, with the corresponding annotation information.

In some embodiments, the interval comprises a time interval indicating an interval between voice information corresponding to the content to be annotated; and the apparatus is further configured to: in response to a time interval between a time when the content to be annotated appears not for the first time and a time when the content to be annotated was previously displayed with the corresponding annotation information being greater than a predetermined duration threshold, determine that the time interval satisfies the predetermined interval condition.

In some embodiments, the interval comprises a text interval, and the text interval is used to represent a position interval of the same content to be annotated in the subtitle information; and the apparatus is further configured to: in response to a text interval between a time when the content to be annotated appears not for the first time and a time when the content to be annotated was previously displayed with the corresponding annotation information being greater than a predetermined duration threshold, determine the text interval satisfies the predetermined interval condition.

In some embodiments, the text length threshold indicates a line difference between text lines in the subtitle information being greater than a predetermined line difference.

In some embodiments, the multimedia conference is a real-time multimedia conference in a conference process.

Figure 6:
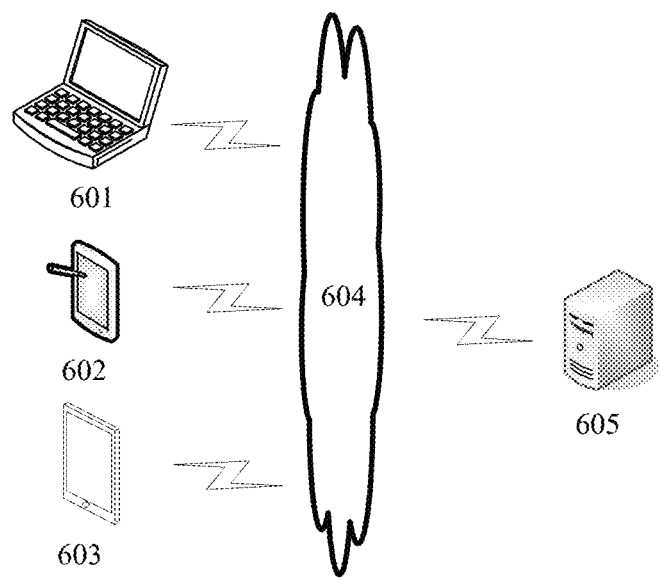
FIG. 6 is an example system architecture in which a method of displaying of an embodiment of the present disclosure may be applied.

Reference is further made to FIG. 6, which shows an example system architecture to which the method of displaying according to an embodiment of the present disclosure may be applied.

As shown in FIG. 6, the system architecture may include terminal devices 601, 602 and 603, a network 604, and a server 605. The network 604 configured to provide a medium for communication links between the terminal devices 601, 602, 603 and the server 605. The network 604 may include various connections, such as connections based on wired communication links, connections based on wireless communication links, or connections based on fiber optic cables.

The terminal devices 601, 602, and 603 may communicate with the server 605 via the network 604 to receive or transmit messages. Various client applications, such as web browser applications, search applications, and news information applications, may be installed on the terminal devices 601, 602 and 603. The client applications installed on the terminal devices 601, 602, and 603 may receive an instruction from the user, and perform a function based on the instruction from the user, such as adding information based on the instruction from the user.

The terminal devices 601, 602, and 603 may be in a form of hardware or software. In a case that the terminal devices 601, 602, and 603 are in a form of hardware, the terminal devices 601, 602, and 603 may be various electronic devices that have a display screen and support web browsing, including but not limited to smart phones, tablet computers, e-book readers, MP3 (Moving Picture Experts Group Audio Layer III) players, MP4 (Moving Picture Experts Group Audio Layer IV) players, laptops and desktops. In a case that the terminal devices 601, 602, and 603 are in a form of software, the terminal devices 601, 602, and 603 may be installed in the electronic devices listed above. The terminal devices 601, 602, and 603 may be implemented as multiple software or software modules (such as software or software modules for providing distributed services) or may be implemented as a single software or software module, which is not limited herein.

The server 605 may provide various services. For example, the server 605 may receive information acquisition requests from the terminal devices 601, 602, and 603, obtain display information corresponding to the information acquisition request in various ways based on the information acquisition request, and transmit data of the display information to the terminal devices 601, 602, and 603.

It should be noted that the method of displaying according to the embodiments of the present disclosure may be performed by a terminal device, and the apparatus for displaying may be arranged in the terminal devices 601, 602, and 603. In addition, the method of displaying according to the embodiments of the present disclosure may be performed by the server 605, and the apparatus for displaying may be arranged in the server 605.

It should be understood that the numbers of terminal devices, networks and servers in FIG. 6 are only illustrative, and any number of numbers of terminal devices, networks and servers may be configured according to implementation requirements.

Hereinafter, reference is made to FIG. 7, which shows a schematic structural diagram of an electronic device (such as the terminal device or the server shown in FIG. 6) suitable for implementing the embodiments of the present disclosure. The terminal devices according to the embodiments of the present disclosure may include, but are not limited to, mobile terminals, such as mobile phones, laptops, digital broadcast receivers, PDAs (personal digital assistants), PADs (tablet PCs), PMPs (portable multimedia players) and vehicle-mounted terminals (such as in-vehicle navigation terminals), and fixed terminals such as digital TVs and desktop computers. The electronic device shown in FIG. 7 is only an example and should not indicate any limitation to the function and application scope of the embodiments of the present disclosure.

Figure 7:
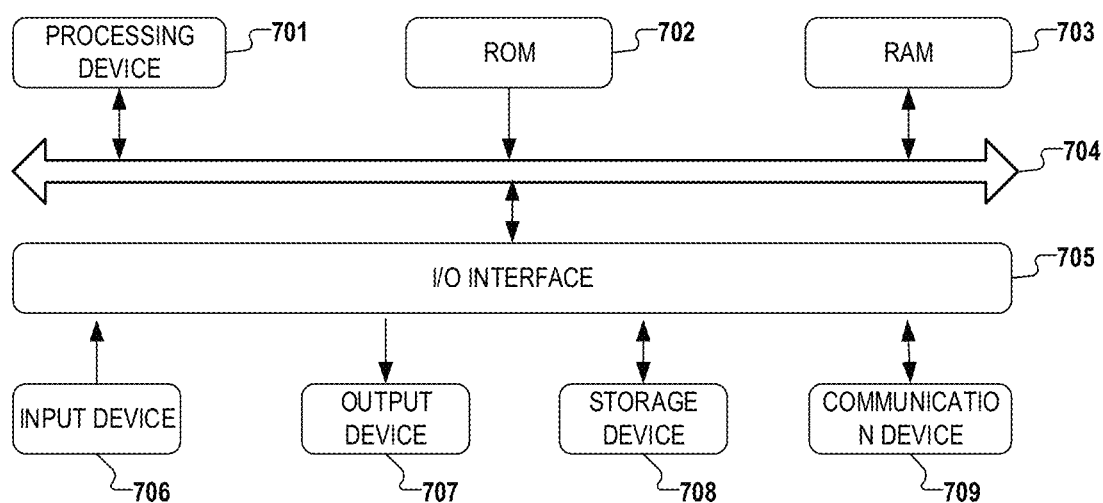
FIG. 7 is a schematic diagram of a basic structure of an electronic device provided by embodiments of the present disclosure.

As shown in FIG. 7, the electronic device may include a processing device 701 (such as a central processor and a graphics processor) which may execute various operations and processing through a program stored in a Read Only Memory (ROM) 702 or a program loaded from the storage device 708 into a Random Access Memory (RAM) 703. The RAM 703 is further configured to store various programs and data required by the electronic device 700. The processing device 701, the ROM 702 and the RAM 703 are connected to each other through a bus 704. An Input/output (I/O) interface 705 is also connected to the bus 704.

Generally, the I/O interface 705 may be connected to: an input device 706, such as a touch screen, a touch panel, a keyboard, a mouse, a camera, a microphone, an accelerometer, and a gyroscope; an output device 707, such as a liquid crystal display (LCD), a speaker, and a vibrator; a storage device 708 such as a magnetic tape, a hard disk, and a memory card; and a communication device 709. The communication device 709 enables the electronic device to perform wireless or wired communication with other devices for data exchanging. Although FIG. 7 shows an electronic device having various components, it should be understood that the illustrated components are not necessarily required to all be implemented or included. Alternatively, more or fewer components may be implemented or included.

Particularly, according to some embodiments of the present disclosure, the process described above in conjunction with flow charts may be implemented as a computer software program. For example, a computer program product is further provided according to some embodiments of the present disclosure, including a computer program carried on a computer readable medium. The computer program includes program codes for performing the method shown in the flow charts. In the embodiments, the computer program may be downloaded and installed from the network via the communication device 709, or installed from the storage device 708, or installed from the ROM 702. When the computer program is executed by the processing device 701, the above-mentioned functions defined in the method according to the embodiments of the present disclosure are performed.

It should be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In some embodiments of the present disclosure, the computer readable storage medium may be any tangible medium containing or storing a program, and the program may be used by or in combination with an instruction execution system, apparatus, or device. In some embodiments of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

In some embodiments, the client and the server may perform communication using any currently known or future developed network protocol such as HTTP (HyperText Transfer Protocol) and may be interconnected with any form or medium of digital data communication (for example, a communication network). The communication network embodiments include local area networks ("LANs"), wide area networks ("WANs"), internet, end-to-end networks (for example, ad hoc end-to-end networks), and any networks currently known or developed in the future.

The computer readable medium may be incorporated in the electronic device or may exist alone without being assembled into the electronic device.

The computer readable medium carries one or more programs. The one or more programs, when being executed by the electronic device, cause the electronic device to: obtain subtitle information of a multimedia conference, wherein the subtitle information is obtained by converting voice information in the multimedia conference; determine content to be annotated in the subtitle information; obtain annotation information of the content to be annotated; and display the subtitle information and display the annotation information corresponding to the content to be annotated.

Computer program code for performing operations of the present disclosure may be written in one or more programming languages, or a combination of the foregoing, and the programming language includes, but is not limited to, object-oriented programming languages, such as Java, Smalltalk, and C++, also includes conventional procedural programming languages, such as "C" language or similar programming languages. The program codes may be executed entirely on a user's computer, or be executed partly on the user's computer, or be executed as a stand-alone software package, or be executed partly on the user's computer and partly on a remote computer or be executed entirely on the remote computer or server. In a case that the execution of the program code involves a remote computer, the remote computer may be connected to a user's computer via any kind of network, including a local area network (LAN) or a wide area network (WAN), or may be connected to an external computer (for example, via an Internet providing by an Internet service provider).

The flow charts and block diagrams in the Figures shows the architecture, functionality and operation of possible implementations of the products of system, method and computer program provided according to the embodiments of the present disclosure. Each block in the flow charts or block diagrams can represent a module, a program segment, or a part of codes, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It also should be noted that each block in the block diagrams and/or flow charts, and combinations of blocks in the block diagrams and/or flowcharts, can be implemented by a dedicated hardware-based system which is configured to implement specified functions or operations, or can be implemented by using a combination of dedicated hardware and computer instructions.

The units mentioned in the description of the embodiments of the present disclosure may be implemented by means of software, or otherwise by means of hardware. The designation of these units does not in any case constitute a qualification of the unit itself. For example, the displaying unit may also be described as "a unit for obtaining subtitle information".

The functions described above in this application may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD), and so on.

In the context of present disclosure, a machine-readable medium may be a tangible medium, which may contain or store a program used by the instruction execution system, apparatus, or device or a program used in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of thereof. The machine-readable storage media, for example, includes an electrical connection based on one or more wires, a portable computer disk, a hard drive, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of thereof.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

In addition, although the operations are described in a specific order, it should not be understood that these operations are to be performed in the specific order shown or performed in a sequential order. Under certain circumstances, multitasking and parallel processing may be advantageous. Although the specific implementation details are described above, these implementation details should not be construed as limiting the scope of the present disclosure. The features described in multiple separate embodiments may be implemented in combination in a separate embodiment. Conversely, the features described in a separate embodiment may be implemented in multiple embodiments individually or in any suitable sub-combination.

Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims.

What is claimed is:

1. A method of displaying, comprising:
    obtaining subtitle information of a multimedia conference, wherein the subtitle information is obtained by converting voice information in the multimedia conference;
    determining content to be annotated in the subtitle information;
    obtaining annotation information of the content to be annotated;
    displaying the subtitle information and displaying the annotation information corresponding to the content to be annotated;
    wherein the determining content to be annotated in the subtitle information comprises:

determining a user group lexicon corresponding to a user group, based on a participating user of the multimedia conference belonging to the user group, wherein the user group lexicon comprises entries and entry explanations; and determining the content to be annotated in the subtitle information based on the user group lexicon.

2. The method of claim 1, wherein the determining the content to be annotated in the subtitle information based on the user group lexicon comprises:

selecting, from words of the subtitle information, a word contained in an entry having a predefined feature in the user group lexicon, as the content to be annotated.

3. The method of claim 2, wherein the predefined feature comprises an entry being an abbreviated entry, and the annotation information comprises a full name of the entry; and the displaying the subtitle information and displaying the annotation information corresponding to the content to be annotated comprise:

displaying a full name of an entry corresponding to the content to be annotated.

4. The method of claim 1, wherein the determining content to be annotated in the subtitle information comprises:

determining a first language of the multimedia conference, wherein the first language is determined based on at least one of: a region of a participant object of the multimedia conference, a native language of the participant object of the multimedia conference and a preset language of the multimedia conference; and determining the content to be annotated from words in a second language in the subtitle information, wherein the second language is a language other than the first language.

5. The method of claim 4, wherein the determining the content to be annotated from words in a second language in the subtitle information comprises:

selecting, from the words in the second language in the subtitle information, a word contained in a predetermined lexicon in the second language, as content to be annotated, wherein the lexicon in the second language comprises entries in the second language and corresponding paraphrases in the first language.

6. The method of claim 5, wherein the paraphrases in the first language comprise at least two sub-paraphrases; and the displaying the subtitle information and displaying the annotation information corresponding to the content to be annotated comprise:

selecting a sub-paraphrase related to context information from the paraphrases in the first language corresponding to the content to be annotated, based on the content to be annotated being located in the context information in the subtitle information; and displaying the selected sub-paraphrase corresponding to the content to be annotated.

7. The method of claim 1, wherein the determining content to be annotated in the subtitle information comprises:

selecting, from words in the subtitle information, a word contained in a predetermined lexicon of rarely-used words, as the content to be annotated.

8. The method of claim 1, wherein the displaying the subtitle information and the displaying the annotation information corresponding to the content to be annotated comprises:

displaying the content to be annotated in the subtitle information, in association with the corresponding annotation information.

9. The method of claim 8, wherein the content to be annotated in the subtitle information is displayed in association with the corresponding annotation information by at least one of:

at least one difference in display styles existing between the content to be annotated and content in the displayed subtitle other than the content to be annotated;

an area for displaying annotation information and an area for displaying subtitle being non-overlapping;

the area for displaying the annotation information being embedded in the area for displaying the subtitle;

in response to triggering on the content to be annotated, displaying the annotation information corresponding to the content to be annotated;

displaying the annotation information in a floating window, in association with the corresponding content to be annotated; or a first displaying duration of the content to be annotated in the subtitle information being not greater than a second displaying duration of the corresponding annotation information in a real-time multimedia conference.

10. The method of claim 1, further comprising:

for content to be annotated appearing at least twice in the multimedia conference, determining an interval between the content to be annotated appearing not for the first time and the content to be annotated being previously displayed with corresponding annotation information; and in response to the interval satisfying a predetermined interval condition, displaying the content to be annotated appearing not for the first time, with the corresponding annotation information.

11. The method of claim 10, wherein the interval comprises a time interval indicating an interval between voice information corresponding to the content to be annotated; and the method further comprises:

in response to a time interval between a time when the content to be annotated appears not for the first time and a time when the content to be annotated was previously displayed with the corresponding annotation information being greater than a predetermined duration threshold, determining that the time interval satisfies the predetermined interval condition.

12. The method of claim 10, wherein the interval comprises a text interval, and the text interval is used to represent a position interval of the same content to be annotated in the subtitle information; and the method further comprises:

in response to a text interval between a time when the content to be annotated appears not for the first time and a time when the content to be annotated was previously displayed with the corresponding annotation information being greater than a predetermined duration threshold, determining the text interval satisfies the predetermined interval condition.

13. The method of claim 12, wherein the text length threshold indicates a line difference between text lines in the subtitle information being greater than a predetermined line difference.

14. The method of claim 1, wherein the multimedia conference is a real-time multimedia conference in a conference process.

15. An electronic device, comprising:
one or more processors;
a storage device, configured for storing one or more programs,
the one or more programs, when executed by the one or more processors, causing the one or more processors to perform operations comprising:
obtaining subtitle information of a multimedia conference, wherein the subtitle information is obtained by converting voice information in the multimedia conference;
determining content to be annotated in the subtitle information;
obtaining annotation information of the content to be annotated;
displaying the subtitle information and displaying the annotation information corresponding to the content to be annotated;
wherein the determining content to be annotated in the subtitle information comprises:
determining a user group lexicon corresponding to a user group, based on a participating user of the multimedia conference belonging to the user group, wherein the user group lexicon comprises entries and entry explanations; and
determining the content to be annotated in the subtitle information based on the user group lexicon.

16. The electronic device of claim 15, wherein the determining the content to be annotated in the subtitle information based on the user group lexicon comprises:
selecting, from words of the subtitle information, a word contained in an entry having a predefined feature in the user group lexicon, as the content to be annotated.

17. The electronic device of claim 16, wherein the predefined feature comprises an entry being an abbreviated entry, and the annotation information comprises a full name of the entry; and
the displaying the subtitle information and displaying the annotation information corresponding to the content to be annotated comprise:
displaying a full name of an entry corresponding to the content to be annotated.

18. A non-transitory computer readable medium, having a computer program stored thereon, the computer program, when executed by a processor, performing operations comprising:
obtaining subtitle information of a multimedia conference, wherein the subtitle information is obtained by converting voice information in the multimedia conference;
determining content to be annotated in the subtitle information;
obtaining annotation information of the content to be annotated; and
displaying the subtitle information and displaying the annotation information corresponding to the content to be annotated;
wherein the determining content to be annotated in the subtitle information comprises:
determining a user group lexicon corresponding to a user group, based on a participating user of the multimedia conference belonging to the user group, wherein the user group lexicon comprises entries and entry explanations; and
determining the content to be annotated in the subtitle information based on the user group lexicon.

* * * * *